(12) United States Patent
Beneker et al.

(10) Patent No.: US 8,230,729 B2
(45) Date of Patent: *Jul. 31, 2012

(54) FLUID CONDITION AND LEVEL SENSOR

(75) Inventors: Gerrit VanVranken Beneker, Lake Orion, MI (US); Robert Dean Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/436,296

(22) Filed: May 6, 2009

(65) Prior Publication Data

US 2010/0281971 A1 Nov. 11, 2010

(51) Int. Cl.
*G01M 15/09* (2006.01)
(52) U.S. Cl. ..................... 73/114.55
(58) Field of Classification Search ............... 73/114.55, 73/114.56
See application file for complete search history.

(56) References Cited

U.S. PATENT DOCUMENTS

| | | | |
|---|---|---|---|
| 4,583,085 A | 4/1986 | Beller | |
| 4,762,000 A | 8/1988 | Bond, Jr. | |
| 5,921,758 A * | 7/1999 | Anamoto et al. | 417/416 |
| 7,908,912 B2 * | 3/2011 | Van Weelden et al. | 73/114.56 |
| 7,921,703 B2 * | 4/2011 | Keller et al. | 73/114.55 |
| 2005/0212533 A1 | 9/2005 | Itomi | |
| 2008/0093172 A1 * | 4/2008 | Albertson et al. | 184/6.4 |
| 2008/0250851 A1 | 10/2008 | Keller | |
| 2009/0188755 A1 * | 7/2009 | Staley et al. | 184/6.5 |
| 2010/0127718 A1 * | 5/2010 | Albertson et al. | 324/694 |
| 2011/0018723 A1 * | 1/2011 | Keller et al. | 340/603 |

FOREIGN PATENT DOCUMENTS

| | | |
|---|---|---|
| DE | 4125588 A1 | 2/1993 |
| DE | 19902991 C1 | 7/2000 |
| DE | 10242959 A1 | 11/2003 |
| WO | 8603297 | 6/1986 |
| WO | 9113322 | 9/1991 |

* cited by examiner

*Primary Examiner* — John Fitzgerald
(74) *Attorney, Agent, or Firm* — Quinn Law Group, PLLC

(57) ABSTRACT

A fluid condition and level sensor is provided that includes a solenoid body, a coil, and an armature surrounded by the coil. The solenoid body defines an armature chamber in which the armature is movable in response to energizing of the coil. The sensor is mounted to a reservoir such that a first portion of the solenoid body extends into a cavity defined by the reservoir, and so that movement of the armature is substantially transverse to a direction of fluid level change in the reservoir. The first portion of the solenoid body defines an opening permitting fluid communication between the cavity and the armature chamber, such that fluid enters and is displaced from the armature chamber through the opening as the armature moves, movement of the armature within the armature chamber thereby being affected by fluid level in the reservoir.

20 Claims, 3 Drawing Sheets

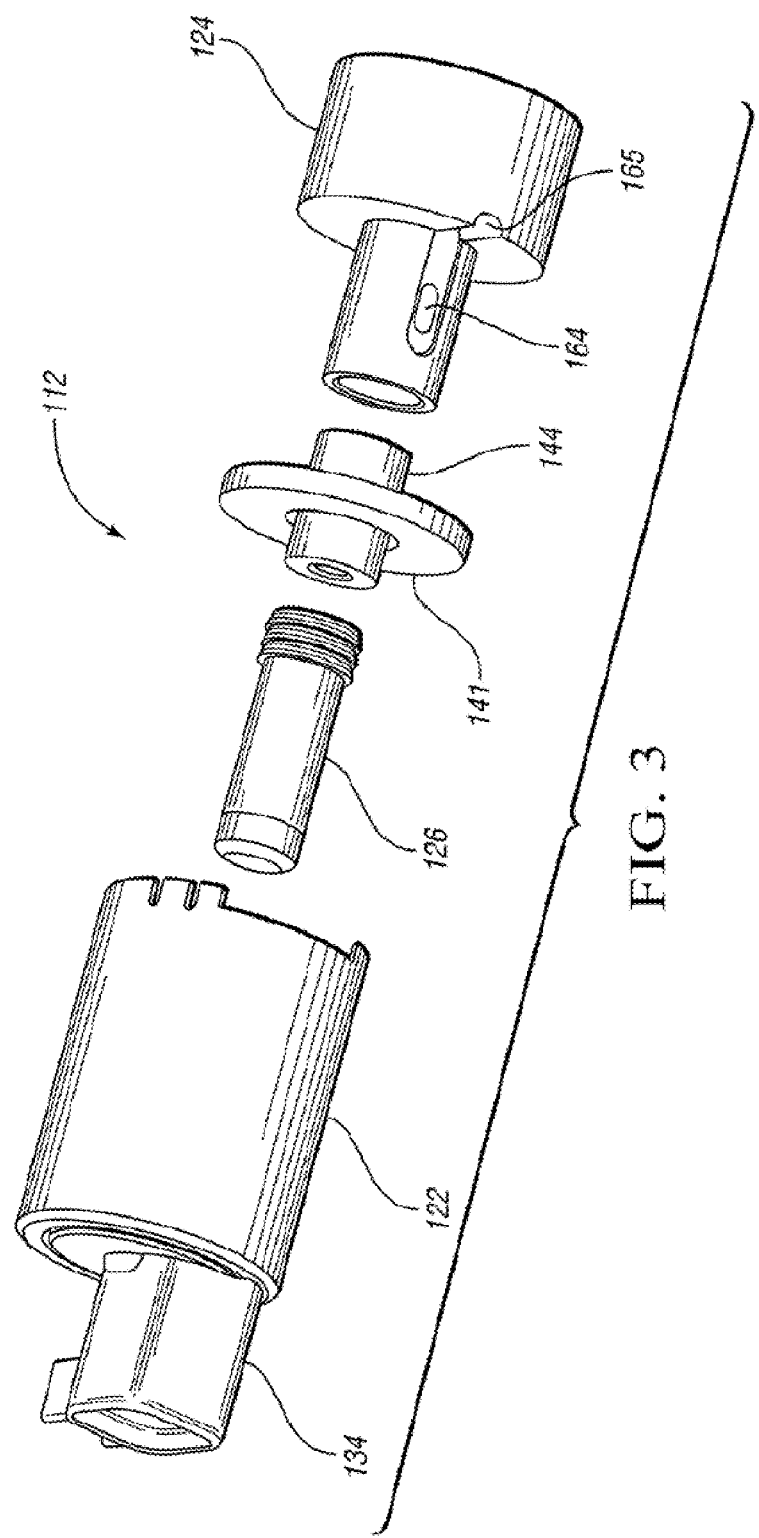

FLUID CONDITION AND LEVEL SENSOR

TECHNICAL FIELD

The present invention relates to fluid level sensors, such as an oil level sensor in an automotive engine.

BACKGROUND OF THE INVENTION

Monitoring fluid levels is important in a wide variety of systems and mechanisms. For example, in many fluid systems, fluid level in a reservoir achieves a static level when the fluid is not in use, and a dynamic level lower than the static level when in use, such as when it is cycled through a system by a pump. Maintaining appropriate static and dynamic levels may be important to system efficiency and function. In one such system, an automotive engine, regular oil changes are necessary for proper maintenance. An oil level sensor may be incorporated into the vehicle to alert the driver when oil needs to be added.

SUMMARY OF THE INVENTION

A fluid condition and level sensor is provided that includes a solenoid body and a coil within the solenoid body. An armature is surrounded by the coil. The solenoid body defines an armature chamber in which the armature is movable in response to energizing of the coil. In a fluid condition and level sensing system, the coil is operatively connected to a controller which can determine at least one of fluid temperature, fluid viscosity, fluid level, and a fluid change occurrence. The sensor may be mounted to a fluid-containing reservoir such that a first portion of the solenoid body extends into a cavity defined by the reservoir. The sensor may be positioned so that movement of the armature is substantially transverse to a direction of fluid level change in the reservoir. The first portion of the solenoid body within the cavity defines an opening permitting fluid communication between the cavity and the armature chamber, such that movement of the armature within the armature chamber is affected by fluid level in the reservoir.

The sensor may be referred to as an integrated fluid condition and level sensor as multiple sensing functions may be integrated into one sensor. The sensor may be used in many different applications where there is a need to measure fluid level, fluid viscosity and/or fluid temperature, such as in engines, transmissions, differentials, food processing, stationary press oil gear boxes, and fluid cooling systems.

In some embodiments, the solenoid body defines a second opening, with the first and second openings arranged to permit fluid communication between fluid in the reservoir and the armature chamber at respective opposing sides of the armature and at different levels within the reservoir. Travel time of the armature in the armature chamber corresponds to the resistance to fluid flow through the openings. The "fluid flow" through each respective opening may be air, a liquid, such as oil, or a combination of both, and depends upon the fluid level (i.e., liquid level) in the reservoir.

For example, if liquid level is low, air, rather than liquid, will be drawn into the armature chamber. Because air flows much more freely than liquid, the average armature travel time, also referred to as response time, will be shorter when liquid level is low. Thus, the "fluid flow" within the chamber and through the openings discussed herein may be either air or a liquid, depending on liquid level in the reservoir.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic perspective illustration in exploded view of the fluid condition and level sensor of FIG. 2.

DESCRIPTION OF THE PREFERRED EMBODIMENTS

Figure 1:
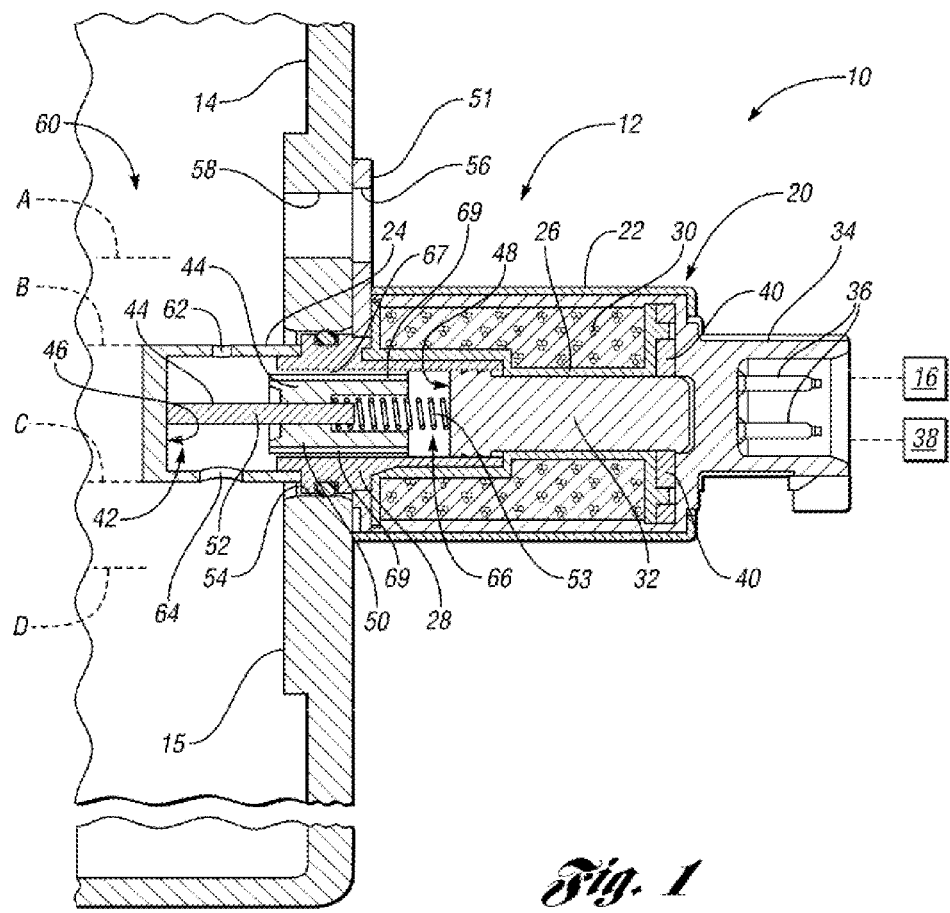
FIG. 1 is a schematic cross-sectional illustration of a first embodiment of an a fluid condition and level sensing system including an fluid condition and level sensor mounted to a fluid-containing reservoir shown in fragmentary cross-sectional view.

Referring to the drawings, wherein like reference numbers refer to like components, FIG. 1 shows a fluid condition and level sensing system 10 including a fluid condition and level sensor 12 extending through a side wall 14 of a fluid reservoir 15. The fluid reservoir 15 may be an oil pan in an engine, or a transmission, may be a differential, a food processing container, or any fluid reservoir. The sensor 12 is secured to the reservoir 15, such as an engine oil pan on a vehicle, so that the fluid condition and level sensor 12 is positioned in the reservoir 15 to enable detection of multiple fluid conditions, including fluid temperature, fluid viscosity, a full fluid level, and a low fluid level, as further described herein. The fluid condition and level sensor 12 is operatively connected to an electronic controller 16, which may be contained either inside or outside of the reservoir 15, such as on a vehicle engine or elsewhere in the vehicle.

Referring to FIG. 1, the fluid condition and level sensor 12 has a solenoid body 20 that includes an outer portion 22, also referred to as a can, a base portion 24, a coil support portion 26, an extension portion 28 and a cap portion 34. The coil support portion 26 (also referred to as a bobbin) supports a coil 30. The outer portion 22, base portion 24, coil support portion 26, extension portion 28, and cap portion 34 may be made integral or made unitary with one another by casting, molding, or other processes.

A pole piece 32 is press-fit or otherwise secured within the outer portion 22. The cap portion 34 surrounds a distal end of the pole piece 32 and has an electrical connector 36 therethrough operatively connected to a power source 38, such as a battery, and to the controller 16. Flux collectors 40 are positioned between the pole piece 32 and the cap portion 34.

The base portion 24 and extension portion 28 of the solenoid body 20, along with the pole piece 32, define an armature chamber 42 in which an armature 44 travels between an end surface 46 of the base portion 24 and an end surface 48 of the pole piece 32. The armature 44 includes a body portion 50 and a rod portion 52 extending therefrom. A biasing device, such as spring 53, is positioned between the pole piece 32 and the armature body portion 50 to bias the armature 44 away from the pole piece 32 to the unenergized position shown (i.e., the position of the armature 44 when the coil 30 is not energized).

A mounting flange 51 secures the sensor 12 through an opening 54 in the reservoir side wall 14. A bolt or other fastening mechanism (not shown) extends through mating openings 56, 58 of the flange 51 and the side wall 14. When secured to the reservoir 15, the base portion 24 extends into a cavity 60 defined by the reservoir 15. The remainder of the sensor 12 is external to the reservoir 15. The base portion 24 has an upper opening 62 and a lower opening 64. As used herein, upper opening 62 is referred to as the first opening.

The armature 44 travels generally transverse to a direction of fluid level change in the reservoir 15. That is, the armature 44 travels back and forth in the armature chamber 42 generally transverse (perpendicular) to the direction of decreasing fluid level (from level A, to level B, to level C, to level D), or increasing fluid level (from level D, to level C, to level B, and to level A). The sensor 12 may alternatively be mounted so that the armature travels at a different angle with respect to fluid in the reservoir 15.

The pole piece 32, outer portion 22, coil 30, flux collectors 40, flange 51 and armature 44 form an electromagnet. Lines of flux are created in a gap 66 between the pole piece 32 and the armature 44 when the coil 30 is energized by the electric source 38. When the coil 30 is energized, the magnetic flux drives the armature 44 toward the pole piece 32, decreasing the portion of the armature chamber 42 between end surface 48 and the armature 44. When energy to the coil 30 ceases, the spring 53 drives the armature 44 back to the unenergized position shown, increasing the portion of the armature chamber 44 between surface 48 and armature 44. Fluid, whether air or liquid, is pushed through the openings 62, 64 as the armature 44 travels. Fluid in the gap 66 of the armature chamber 42 is also forced through a clearance 67 between the outer diameter of the armature 44 and the inner diameter of the extension portion 28 as the armature 44 is cycled. Fluid is similarly forced through channels 69 in the armature 44. The clearance 67 and channels 69 are configured to be more resistant to fluid flow than the openings 62, 64. Thus, armature travel time is a function of the resistance to fluid flow through clearance 67 and channels 69, which in turn is dependent on whether air or liquid is present in the chamber 42 and forced through the clearance 67 and channels 69.

The solenoid valve 20 has a distinctive inductive kick, which is a distinct dip in current draw followed by an increase in current draw indicative of the armature 44 reaching the end of travel under known fluid temperature and fluid fill level. The time period to an inductive kick after the solenoid valve 20 is energized, is thereby affected by the resistance to travel encountered by the armature 44.

The chamber 42, clearance 67, channels 69, and openings 62, 64 described above establish armature travel times indicative of various fluid conditions such as fluid viscosity and a fluid change occurrence, as well as various fluid levels in the reservoir 15, as described below. By tracking the time until inductive kick, and comparing the time with predetermined times in a look-up table stored on the controller 16, the controller 16 is able to determine liquid level and viscosity. The sensor 12 is also operable to determine oil temperature based on current.

Fluid Viscosity

When the coil 30 is energized and deenergized, the armature 44 moves within the chamber 42. When the armature 44 moves away from the pole piece 32, fluid is also pushed through clearance 67 and channels 69 from chamber 42. By summing the total resistance to fluid flow through the clearance 67 and channels 69 and friction of the moving parts, this slows the armature movement such that by measuring the time of armature motion and then applying an algorithm stored in controller 16, the response time corresponds to a value indicating the viscosity of the fluid. A higher fluid viscosity causes the armature 44 to move more slowly as it is cycled, increasing the armature response time. The inductive "kick" that occurs at the end of the armature travel in the cycle is detected by the controller 16, which is connected to coil 30. The thicker the fluid, the longer it will take for the inductive kick to occur. The total armature response time is then checked in a look-up table stored in the controller 16 to obtain the relative viscosity of the fluid. Fluid viscosity can thus be measured using the sensor 12, except when liquid fluid level is at an extreme low level (i.e., below opening 64, such as at level D).

The resistance of the sensor 12 may also be measured and the engine controller voltage controlled to maintain a constant operating current to the sensor 12 and thus a constant force of the armature 44. This reduces any effects of current variability on the armature response time. Limiting the voltage below 12 volts can slow the armature 44 even further to modify the response time versus viscosity relationship and thereby increase the sensor sensitivity.

Fluid Level

When liquid fluid within the reservoir 15 is above a predetermined full level B, such as at level A, armature travel time is a function of the sum of the resistances to fluid travel through the clearance 67 and the channels 69, with viscous drag on the armature 44 also having a slight effect. The openings 62, 64 are sized large enough to permit fluid flow therethrough relatively freely, so that flow through the clearance 67 and channels 69 determines armature travel time. Because these resistances will vary as liquid fluid level varies, the fluid condition system 10 can monitor and record liquid fluid level within the reservoir 15, recognizing the instant current liquid level as being within one of two ranges: above a first level (full level B), and below a second level (low level C. This information can be conveyed to a system operator, such as a vehicle driver, if desired, by connecting a display monitor, such as on an instrument panel screen, to the controller 16 and programming the controller 16 to send a display signal to the monitor corresponding to the monitored fluid level.

If liquid level in the pan 15 is at any level below the opening 64 (i.e., below level C), as indicated by "excessive low" fluid level D in FIG. 1, any fluid in the chamber 42 is forced out of openings 62, 64 on the first armature cycle. When the armature 44 cycles, air is drawn into the chamber 42 instead of liquid, since the openings 62, 64 are above the liquid level. On subsequent cycles, because only air is moving through the openings 62, 64, clearance 67, and channels 69, the armature movement time is relatively fast. Thus, the controller 16 will recognize such an armature travel time as indicative of an "excessive low" liquid fluid level, will store this information, and may be programmed to send a notification to a display in order to notify the vehicle operator of the need to add fluid.

When liquid fluid is at any level above the opening 62 (i.e., above level B), the chamber 42 will be constantly filled with liquid as the armature 44 travels, and liquid will be forced through the clearance 67 and channels 69. This will create a unique armature travel time recognized by the controller 16 as indicative of a full liquid fluid level, and being a function of the sum of resistances to fluid flow through clearance 67 and channels 69. The sensor 12 may be mounted to the reservoir 15 such that level B represents a minimum desired static liquid level and level C represents a minimum desired dynamic liquid level.

Fluid Temperature

The temperature of the coil 30 will be affected by the fluid. To measure fluid temperature, the coil resistance is measured and then checked against a temperature look-up table stored within the controller to determine the temperature of the fluid. Alternatively, the sensor 12 may be cycled with a predefined voltage. By measuring the current, the coil resistance can be calculated and then correlated with temperature.

Second Embodiment

Figure 2:
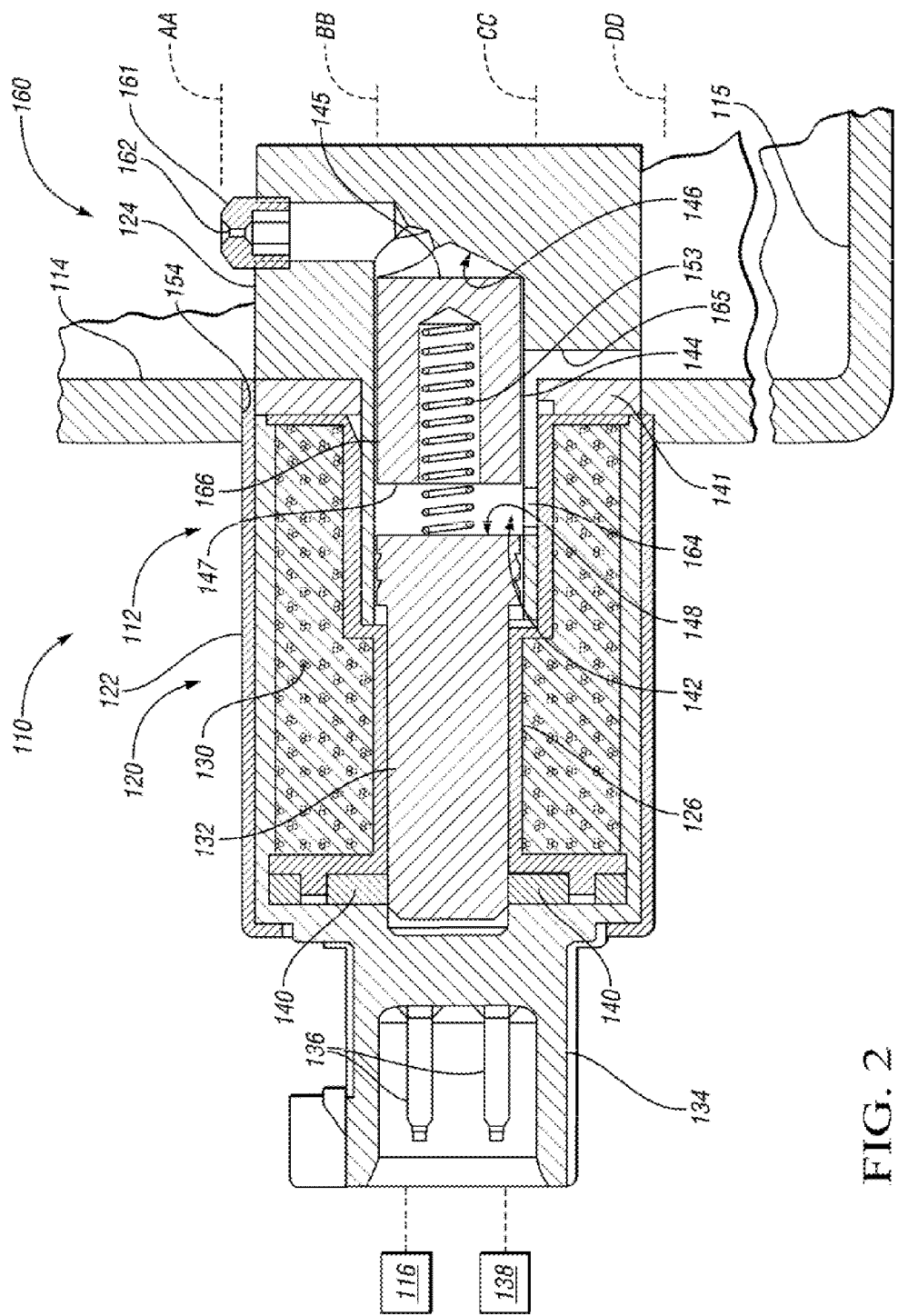
FIG. 2 is a schematic cross-sectional illustration of a second embodiment of a fluid condition and level sensing system including a fluid condition and level sensor.

Referring to FIG. 2, another embodiment of a fluid condition and level sensing system 110 including a fluid condition and level sensor 112 extending through a side wall 114 of a reservoir 115. The sensor 112 is secured the reservoir 115, such as an engine oil pan on a vehicle, so that the fluid condition and level sensor 112 is positioned in the reservoir 115 to enable detection of multiple fluid conditions, including fluid temperature, fluid viscosity, and multiple fluid levels, as further described herein. The fluid condition and level sensor 112 is operatively connected to an electronic controller 116, which may be contained either inside or outside of the reservoir 115, such as on a vehicle engine or elsewhere in the vehicle.

Referring to FIG. 2, the fluid condition and level sensor 112 has a solenoid body 120 that includes an outer portion 122, also referred to as a can, a base portion 124, a coil support portion 126, and a cap portion 134. The coil support portion 126 (also referred to as a bobbin) supports a coil 130. The outer portion 122, base portion 124, coil support portion 126, and cap portion 134 may be made integral or made unitary with one another by casting, molding, or other processes.

A pole piece 132 is press-fit or otherwise secured within the outer portion 122. The cap portion 134 surrounds a distal end of the pole piece 132 and has an electrical connector 136 therethrough operatively connected to a power source 138, such as a battery, and to the controller 116. Flux collectors 140 are positioned between the pole piece 132 and the cap portion 134. A washer 141 is positioned between the coil support portion 126 and the base portion 124.

The base portion 124 of the solenoid body 120, along with the pole piece 132, define an armature chamber 142 in which an armature 144 travels between an unenergized position shown (near an end surface 146 of the base portion 124) and an energized position (closer to an end surface 148 of the pole piece 132). A biasing device, such as spring 153, is positioned between the pole piece 132 and the armature 144 to bias the armature 144 away from the pole piece 132 to the unenergized position shown (i.e., the position of the armature 144 when the coil 130 is not energized).

A mounting flange (not shown) secures the sensor 112 through an opening 154 in the reservoir side wall 114. A bolt or other fastening mechanism (not shown) extends through mating openings of the flange and the side wall 114. When secured to the reservoir 115, the base portion 124 extends into a cavity 160 defined by the reservoir 115. The remainder of the sensor 112 is external to the reservoir 115.

The base portion 124 has an extension 161 with an upper opening 162 and a lower opening 164. As used herein, upper opening 162 is referred to as the first opening. As best shown in FIG. 3, the lower opening 164 extends axially and is in communication with a radial slot 165.

In this embodiment, the armature 144 travels generally transverse to a direction of fluid level change in the reservoir 115. That is, the armature 144 travels back and forth in the armature chamber 142 generally transverse (perpendicular) to the direction of decreasing liquid fluid level from level AA, to level BB to level CC, to level DD, or increasing liquid fluid level change from level DD, to level CC, to level BB, and to level AA. The sensor may alternatively be positioned so that the armature travels at other angles with respect to the fluid level.

The pole piece 132, outer portion 122, coil 130, flux collectors 140, washer 141 and armature 144 form an electromagnet. Magnetic flux is created when the coil 130 is energized by the electric source 138. The magnetic flux drives the armature 144 toward the pole piece 132, increasing the portion of the armature chamber 142 between end surface 146 and the side 145 of the armature 144. When energy to the coil 130 ceases, the spring 153 drives the armature 144 back to the unenergized position shown, decreasing the portion of the armature chamber 142 between surface 146 and armature 144. Fluid, whether air or liquid, such as oil, is pushed through the openings 162, 164 as the armature 144 travels. Opening 162 communicates air or liquid with the chamber 142 at a first side 145 of the armature 144. Opening 164 communicates air or liquid within the reservoir 115 below level DD with a second side 147 of the armature 144. Air can be communicated between the portions of the chamber 142 at the two sides 145, 147 of the armature 144 through a clearance 166 between the inner diameter of the cavity forming the chamber 142, and the outer diameter of the armature 144. The clearance 166 is designed to inhibit any communication of liquid therethrough. Thus, armature travel time is a function of the resistance to fluid flow through the openings 162, 164, which in turn is dependent on whether air or liquid is flowing through the openings. The time period to an inductive kick after the solenoid 112 is energized, is thereby affected by the resistance to fluid flow through the openings 162, 164. The chamber 142 and openings 162, 164 described above establish armature travel times indicative of various fluid conditions such as fluid viscosity and a fluid change occurrence, as well as various fluid levels in the reservoir 115, as described below. By tracking the time until inductive kick, and comparing the time with predetermined times in a look-up table stored on the controller 116, the controller 116 is able to determine liquid fluid level and viscosity. The sensor 112 is also operable to determine fluid temperature based on current.

Fluid Viscosity

When the coil 130 is cycled (energized and deenergized), the armature 144 moves back and forth within the chamber 142. When the coil 130 is energized and deenergized, the armature 144 moves toward and away from the pole piece 132, respectively, and fluid is pushed through openings 162, 164 from chamber 142. The total resistance to fluid flow of the openings 162, 164 and friction of the moving parts slows the armature movement such that by measuring the time of armature motion and then applying an algorithm stored in the controller 116, the response time corresponds to a value indicating the viscosity of the fluid. A higher fluid viscosity causes the armature 144 to move more slowly as it is cycled, increasing the armature response time. The inductive "kick" that occurs at the end of the armature travel toward the pole piece 132 is detected by the controller 116, which is connected to coil 130. The thicker the fluid, the longer it will take for the inductive kick to occur. The total armature response time is then checked in a look-up table stored in the controller 116 to obtain the relative viscosity of the fluid. Fluid viscosity can thus be measured using the sensor 112 (except when fluid is at an extreme low level (i.e., below opening 164, such as at level D)).

The resistance of the sensor 112 may also be measured and the engine controller voltage controlled to maintain a constant operating current to the sensor 112 and thus a constant force of the armature 144. This reduces any effects of current variability on the armature response time. Limiting the voltage below 12 volts can slow the armature 144 even further to modify the response time versus viscosity relationship and thereby increase the sensor sensitivity.

Fluid Level

When liquid within the reservoir 115 is above a predetermined full level AA, armature travel time is a function of the sum of the resistances to fluid travel through each of the openings 162, 164, with viscous drag on the armature 144 also having a slight effect. Because these resistances will vary as liquid fluid level varies, the fluid condition system 110 can monitor and record fluid level within the reservoir 115, recognizing the current liquid fluid level as being within one of three ranges: above level AA (e.g., an overfill level), below level DD (e.g., a low level), and between level AA and level DD (e.g., a full level). This information can be conveyed to a vehicle operator, if desired, by connecting a display monitor, such as on an instrument panel screen, to the controller 116 and programming the controller 116 to send a display signal to the monitor corresponding to the monitored liquid fluid level.

If fluid level in the reservoir 115 is at any level below the opening 164, (i.e., any level below level DD in FIG. 1), any liquid fluid in the chamber 42 is forced out on the first armature cycle. When the armature 144 cycles, air is drawn into the chamber 42 instead of liquid, since the openings 162, 164 are above the liquid fluid level. On subsequent cycles, because only air is moving through the openings 162, 164, the armature movement time is relatively fast. Thus, the controller 116 will recognize such an armature travel time as indicative of an "excessive low" liquid fluid level, will store this information, and may be programmed to send to a display a notification to the system operator of the need to add oil.

If liquid fluid level in the pan 115 is at any level below the opening 162, but above the opening 164 (i.e., a level between level AA and level DD, such as level BB and level CC, the armature 144 will displace at least some liquid fluid out of the chamber 142 on the first armature cycle. When the spring 153 biases the armature 144, opening 164 will draw in fluid. Because opening 162 is above the liquid fluid level, and at least some of the chamber 142 is above liquid fluid level, some air will be drawn into the chamber 142 when the sensor 112 is energized. Therefore, the armature movement time will be slower than when liquid fluid is at the extreme low level DD, but not as slow as when fluid level is above opening 162. The controller 116 will compare the armature movement time to stored values and recognize such an armature travel time as indicative of a level between level AA and level DD.

When liquid fluid is at any level above the opening 162, such as above level AA, the chamber 142 will be constantly filled with liquid fluid as the armature 144 travels, and liquid will be forced through openings 162, 164. This will create a unique armature travel time recognized by the controller 16 such as indicative of an overfill level, depending on the mounted position of the sensor 112 within the reservoir 115, and being a function of the sum of resistances to fluid flow through openings 162, 164.

Fluid Temperature

The temperature of the coil 130 will be affected by the fluid. To measure fluid temperature, the coil resistance is measured and then checked against a temperature look-up table stored within the controller to determine the temperature of the fluid. Alternatively, the sensor 112 may be cycled with a predefined voltage. By measuring the current, the coil resistance can be calculated and then correlated with temperature.

While the best modes for carrying out the invention have been described in detail, those familiar with the art to which this invention relates will recognize various alternative designs and embodiments for practicing the invention within the scope of the appended claims.

The invention claimed is:

1. A fluid condition and level sensor for a fluid-containing reservoir, comprising:
a solenoid body configured for mounting to the reservoir;
a coil connected with the solenoid body;
an armature surrounded by the coil; wherein the solenoid body defines an armature chamber in which the armature is movable in response to energizing of the coil;
a pole piece; wherein the armature chamber is between the armature and the pole piece;
wherein at least a first portion of the solenoid body extends into a cavity defined by the reservoir when the solenoid body is mounted to the reservoir;
a biasing device biasing the armature away from the pole piece and toward the first portion of the solenoid body, the biasing device and coil being configured to cycle the armature in the armature chamber as the coil is cyclically energized;
wherein the first portion of the solenoid body within the cavity defines an opening permitting fluid communication between the cavity and the armature chamber, such that fluid enters and is displaced from the armature chamber through the opening as the armature moves, such that fluid level within the armature chamber corresponds with the level of fluid in the reservoir, movement of the armature within the armature chamber thereby being affected by fluid level in the reservoir.

2. The fluid condition and level sensor of claim 1, wherein the sensor is mounted so that movement of the armature is substantially transverse to a direction of fluid level change in the reservoir.

3. The fluid condition and level sensor of claim 1, wherein the opening is sufficiently spaced from the armature such that fluid flow is permitted through the opening during an entire range of motion of the armature within the armature chamber.

4. The fluid condition and level sensor of claim 1, wherein the solenoid body and the armature define a clearance permitting fluid in the armature chamber to move therethrough as the armature moves in the chamber.

5. The fluid condition and level sensor of claim 1, wherein the armature is characterized by an absence of any orifices establishing fluid communication between the armature chamber and the reservoir.

6. The fluid condition and level sensor of claim 1, wherein the opening is a first opening and establishes fluid communication between a first portion of the armature chamber and the cavity; wherein the solenoid body defines a second opening permitting fluid communication between the cavity and a second portion of the armature chamber, the first and second portions being at opposing sides of the armature, both sides of the armature thereby being in fluid communication with the reservoir.

7. The fluid condition and level sensor of claim 6, wherein the first opening is in communication with the reservoir at a higher fluid level than the second opening when the solenoid body is mounted to the reservoir.

8. The fluid condition and level sensor of claim 1, in combination with a controller operatively connected to the coil and operable to determine at least one of fluid temperature, fluid viscosity, and fluid level.

9. The fluid level and condition sensor of claim 8, wherein the controller is configured to determine fluid temperature based on electrical resistance of the coil.

10. The fluid level and condition sensor of claim 8, wherein the controller is configured to determine fluid viscosity based on a comparison of armature travel time with predetermined armature travel times associated with predetermined viscosity values.

11. A fluid condition and level sensing system for a fluid-containing reservoir comprising:

a fluid level sensor having a solenoid body configured for mounting to the reservoir, a coil, an armature, and a pole piece; wherein the solenoid body defines an armature chamber between the armature and pole piece; wherein the armature travels in the armature chamber in response to energizing of the coil;

wherein the solenoid body defines a first opening establishing fluid communication between the armature chamber and a cavity defined by the reservoir when so mounted; travel time of the armature within the armature chamber thereby being affected by fluid level in the reservoir; and a controller operatively connected to the coil and operable to determine at least one of fluid temperature, fluid viscosity, and fluid level.

12. The fluid condition and level sensing system of claim 11, wherein the first opening is sufficiently spaced from the armature such that fluid flow is permitted through the first opening during an entire range of motion of the armature within the armature chamber.

13. The fluid condition and level sensing system of claim 11, wherein the solenoid body and the armature define a clearance permitting fluid in the armature chamber to move therethrough as the armature moves in the chamber.

14. The fluid condition and level sensing system of claim 11, wherein the first opening establishes fluid communication between a first portion of the armature chamber and the cavity; wherein the solenoid body defines a second opening permitting fluid communication between the cavity and a second portion of the armature chamber, the first and second portions being at opposing sides of the armature, both sides of the armature thereby being in fluid communication with the reservoir.

15. The fluid condition and level sensing system of claim 11, wherein the controller is configured to determine fluid temperature based on electrical resistance of the coil.

16. The fluid condition and level sensing system of claim 11, wherein the controller is configured to determine fluid viscosity based on a comparison of armature travel time with predetermined armature travel times associated with predetermined viscosity values.

17. The fluid condition and level sensing system of claim 11, wherein the armature is positioned to travel substantially transverse to fluid level in the reservoir when the solenoid body is mounted to the reservoir.

18. A fluid condition and level sensor in combination with a fluid-containing reservoir comprising:

a solenoid body;

a coil, an armature, and a pole piece; wherein the solenoid body defines an armature chamber between the armature and pole piece; wherein the armature travels in the armature chamber in response to energizing of the coil; wherein the solenoid body defines a first and a second opening permitting fluid communication between fluid in the reservoir and the armature chamber at respective opposing sides of the armature;

wherein the openings are configured to establish positive displacement of fluid through the chamber and openings as the armature travels and to affect travel time of the armature in the armature chamber in correspondence with resistance to fluid flow through the openings.

19. The fluid condition and level sensor and reservoir of claim 18 in further combination with a controller operatively connected to the coil, wherein the fluid condition and level sensor is connected to the reservoir with the sensor configured to be at least partially immersed in fluid at a predetermined first fluid level, and with the second opening lower in the reservoir than the first opening such that armature travel time is correlated by the controller with the predetermined first fluid level when fluid in the reservoir is above the first opening, and with a second fluid level lower than the first fluid level when fluid in the reservoir is below the second opening.

20. The fluid condition and level sensor and reservoir in combination with the controller of claim 19, wherein the first fluid level corresponds with a static fluid level in which the fluid in the reservoir is not in use, and the second fluid level corresponds with a dynamic fluid level in which the fluid is in use.

* * * * *